(12) United States Patent
Hornbeck (10) Patent No.: US 11,684,457 B2
(45) Date of Patent: Jun. 27, 2023

(54) PLATE FOR PRODUCTION OF A DENTAL IMPLANT AND/OR ARTIFICIAL PROSTHESIS

(71) Applicant: LABORATOIRE DENTAIRE HORNBECK JACQUES S.À R.L., Luxembourg (LU)

(72) Inventor: Jacques Hornbeck, Luxembourg (LU)

(73) Assignee: JADE FINANCE S.A.R.L., Luxembourg (LU)

(*) Notice: Subject to any disclaimer, the term of this patent is extended or adjusted under 35 U.S.C. 154(b) by 841 days.

(21) Appl. No.: 15/778,074

(22) PCT Filed: Nov. 25, 2016

(86) PCT No.: PCT/EP2016/078887
§ 371 (c)(1),
(2) Date: May 22, 2018

(87) PCT Pub. No.: WO2017/089583
PCT Pub. Date: Jun. 1, 2017

(65) Prior Publication Data
US 2018/0333813 A1 Nov. 22, 2018

(30) Foreign Application Priority Data

Nov. 26, 2015 (LU) .......................... 92 887

(51) Int. Cl.
*B33Y 30/00* (2015.01)
*A61C 8/00* (2006.01)
(Continued)

(52) U.S. Cl.
CPC .............. *A61C 8/005* (2013.01); *A61C 13/00* (2013.01); *A61C 13/0018* (2013.01);
(Continued)

(58) Field of Classification Search
None
See application file for complete search history.

(56) References Cited

U.S. PATENT DOCUMENTS

| 5,934,906 A | 8/1999 | Phimmasone |
| 2008/0233539 A1 | 9/2008 | Rossler et al. |

(Continued)

FOREIGN PATENT DOCUMENTS

| KR | 20100048244 A | 5/2010 |
| RU | 2421180 C2 | 9/2009 |
| WO | 2013012113 A1 | 1/2013 |

OTHER PUBLICATIONS

International Search Report dated Feb. 6, 2017 re: Application No. PCT/EP2016/078887, pp. 1-3, citing: KR 2010 0048244 A and WO 2013/012113 A1.

(Continued)

*Primary Examiner* — Alison L Hindenlang
*Assistant Examiner* — Debjani Roy
(74) *Attorney, Agent, or Firm* — Cantor Colburn LLP (57) ABSTRACT

The present disclosure concerns a set for the production by 3D printing of implant abutments for dental implants, the set including at least one abutment having an elongated base member with an axis, and at least one positioning element fixed to the base member; a plate with at least one recess and a locking portion; where the recess is larger than the elongated base member and where the locking portion is configured to be in a form fit connection with the positioning element in order to vertically position the abutment, and lock the abutment in rotation around its axis.

8 Claims, 5 Drawing Sheets

(51) Int. Cl.
*A61C 13/00* (2006.01)
*B23Q 3/06* (2006.01)
*B22F 10/10* (2021.01)
*B22F 10/28* (2021.01)

(52) U.S. Cl.
CPC .......... *A61C 13/0019* (2013.01); *B23Q 3/061* (2013.01); *B33Y 30/00* (2014.12); *B22F 10/10* (2021.01); *B22F 10/28* (2021.01); *B23Q 2703/08* (2013.01)

(56) References Cited

U.S. PATENT DOCUMENTS

| | | | | |
|---|---|---|---|---|
| 2011/0065065 | A1* | 3/2011 | Mormann | A61C 13/0022 433/201.1 |
| 2012/0028214 | A1* | 2/2012 | Futterknecht | A61C 8/0001 433/74 |
| 2012/0214133 | A1 | 8/2012 | Jung | |
| 2015/0093719 | A1* | 4/2015 | Beeby | A61C 8/0051 433/202.1 |
| 2016/0199159 | A1* | 7/2016 | Brehm | B29C 43/52 264/16 |
| 2016/0250008 | A1* | 9/2016 | Brun | A61C 13/0019 433/213 |

OTHER PUBLICATIONS

Written Opinion dated Feb. 6, 2017 re: Application No. PCT/EP2016/078887, pp. 1-4, citing: KR 2010 0048244 A and WO 2013/012113 A1.

RU Office Action dated Mar. 25, 2020 re: Application No. 2018 122 088, pp. 1-14, citing: WO 2013/012113 A1, U.S. Pat. No. 5,934,906 A, US 2012/0214133 A1, KR 2010 0048244 A and RU 2 421 180 C2.

* cited by examiner

PLATE FOR PRODUCTION OF A DENTAL IMPLANT AND/OR ARTIFICIAL PROSTHESIS

TECHNICAL FIELD

The present disclosure generally relates to plate, in particular a plate for the production of dental implants and/or artificial prosthesis. The disclosure more particularly relates to a plate for producing a dental implant and/or an artificial prosthesis using 3D laser printing.

BACKGROUND ART

Dental implants are often used when a patient requires a prosthetic device to hold one or more artificial teeth in place. Dental implants as well as dental abutments exist in a great variety of different shapes, sizes and materials. The dental implants are mostly of cylindrical shape and of screw-type implant tapped into the jawbone. Such a dental implant comprises multiple parts: a dental implant fixture, at least one dental implant abutment and a tooth crown or dental prosthesis. The dental fixture is substantially cylindrically shaped with a circular base and is inserted into the jawbone in order to act as an artificial root. The implant fixture is typically made out of titanium or a titanium alloy and is screwed in with its peripherally positioned threaded portion into an opening which has been bored in the jawbone. After the dental fixture is securely fixed, at least one dental implant abutment is connected to the implant fixture. The abutment is usually made of a metallic material for hygienic reason such as e.g. titanium and has an internal passageway with a screw passing through. The screw engages a thread inside the implant fixture to hold the abutment and the tooth crown or artificial prosthesis in place. The dental fixture and the dental implant abutment comprise each a form-fit end portion to each other in order to avoid the dental implant abutment to move or rotate relative to the dental fixture. Both the dental fixture and the dental implant abutment are mainly manufactured by machining comprising high precision tolerances to guaranty a neat insertion onto the jawbone of the patient. Various dental implant abutments are available; they are of all sorts of form, size and material.

Figure 8:
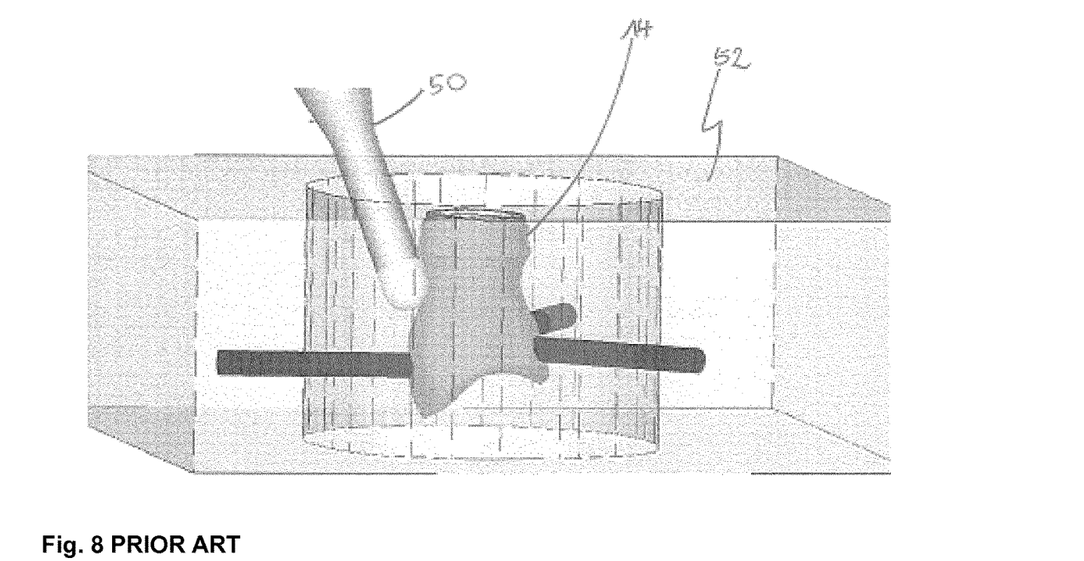
FIG. 8 is a perspective general view of a "traditional" method for manufacturing a tooth crown or artificial prosthesis

The tooth crown or artificial prosthesis is adapted according to the requirement and position of each patient. FIG. 8 shows one way of manufacturing a tooth crown. In fact, the tooth crown is machined out of a solid block 52. This "traditional" method has the disadvantage of great material losses and of unitary realization only. It is impossible to realize all possible forms and requires long and expensive milling cutter 50. Finally, the realization of such a tooth crown as represented in FIG. 8 is highly time-consuming.

The tooth crowns may also be manufactured using 3D printing. For the production of a dental implant and/or an artificial prosthesis, 3D laser printing has shown to be the most adequate one of all sort of different 3D printing. This allows the production of the artificial prosthesis or crown to be made out of material such as titanium. In order to be able to product the artificial prosthesis or crown, the patient mouth will be scanned for generating a 3D digital representation of the patient's set of teeth. This representation is then used for generating a physical embodiment with rapid prototyping technology serving as a master model. A machined hole is drilled in the master model at the exact position at which the dental implant will be inserted into the patient jawbone. The dental fixture as well as at least one dental implant abutment is form fit inserted into the machined hole in the master model. The master model is then used for producing the dental implant and/or an artificial prosthesis by 3D laser printing. As a result, for each production of a dental implant and/or an artificial prosthesis, a hole has to be machined in a master model for accurately accommodating the dental fixture and at least one dental implant abutment. This is time consuming and does not allow usage for same hole in a master model for different types of dental implant abutments.

KR 1020100048244 shows a base plate comprising a plurality of cavities configured to lodge an abutment body for producing by 3D printing a dental implant abutment. The plate may be reused for producing more dental implant abutments. The main drawbacks of this solution are that the plate can only receive one type of abutments, and that there is no efficient way to keep the abutment in a predetermined position during production.

BRIEF SUMMARY

The disclosure provides a plate for production of a dental implant overcoming the problem that each time a new master model with a machined hole form-fitting the dental implant abutment is required.

In order to overcome the above-mentioned issue, the present disclosure relates to a set for producing dental implant and/or artificial prosthesis using 3D printing wherein a plate comprises at least one recess or abutment cavity provided in a first surface of the plate to lodge a dental implant abutment or abutment. Furthermore the dental implant abutment preferably comprises a positioning element or carrier portion and an elongated base member or abutment body. The at least one abutment cavity preferably comprises a locking portion or first cavity portion adapted to engage with at least one part of the carrier portion/positioning element of the dental implant abutment. The at least one abutment cavity further comprises a second cavity portion adapted to lodge the abutment body of the dental implant abutment, wherein the first and second cavity portions are coaxial to an axis and the second cavity portion is larger than the abutment body.

It must be noted that the abutment is made of metal—generally titanium or a titanium alloy—and machined on a highly sophisticated CNC mills. It is thus very easy to produce the abutments together/integral with the positioning element or carrier portion in one step. The manufacturing of the abutments with the positioning element is thus not more complicated or expensive than the manufacturing of the abutments without the positioning element.

After the 3D printing, the resulting dental implant and/or artificial prosthesis will be "reworked"/finished/polished and the positioning element is taken off at the same time, in the same process.

Different sizes and forms of abutments can be used in the same plate either at the same time or successively in different runs. Indeed the abutments all have the same/identical carrier portions/positioning elements and the second cavity portion is larger than the abutment body so that different abutment forms and sizes can be fitted in a plate. The abutments are indeed maintained in place and positioned by the carrier portion/positioning element of the abutment. The abutments are thus safely maintained in place and only one plate must be used for all kinds of abutments.

The at least one part of the carrier portion/positioning element is advantageously engaged with the first cavity portion in such a manner that the dental implant abutment is locked against any rotation about the axis. Preferably, the abutment is also positioned vertically so as to be flush with the upper surface of the plate at the same time by the carrier portion/positioning element.

A further advantageous effect of the present disclosure is that the first cavity portion has a shape of for example a hexagon, a rectangle, a triangle or of at least two interrelated circles. The first cavity portion preferably has a shape with no rotational symmetry. The abutments can thus be positioned precisely into the plate. Although different shapes can be used, preferably only one shape is used for all the cavity portions of the plate.

The abutment cavity comprises a third portion preferably a through hole coaxial to the axis. The through hole may be positioned on the opposite surface of the plate. It is preferably a counter bore through hole or countersunk through hole for accommodating a fixation means, preferably a screw, to enter the second cavity portion for engaging with a threaded portion of the dental implant abutment to fix the later to the plate. Furthermore, the plate preferably comprises a plurality of abutment cavities.

The dental implant abutment comprises preferably a carrier portion and an abutment body, both of which are preferably made out of one piece, wherein the carrier portion advantageously is made in a form of a plate/flat member extending perpendicularly from said abutment body.

According to another aspect of the present disclosure, the carrier portion is adapted to engage, preferably form fit engage with at least one part of a first cavity portion of an abutment cavity of a plate as mentioned above in order to lock the dental implant abutment against a rotation relative to the first cavity portion about an axis.

According to a further aspect, the present disclosure concerns a set for producing a dental implant artificial prosthesis preferably comprises a dental implant abutment and a plate with at least one abutment cavity as mentioned above.

According to a further aspect, the present disclosure concerns a method for 3D printing a dental implant/artificial prosthesis using a dental implant abutment and/or a plate as mentioned above.

BRIEF DESCRIPTION OF THE DRAWINGS

Further details and advantages of the present disclosure will be apparent from the following detailed description of a not limiting embodiment with reference to the attached drawing, wherein.

DESCRIPTION OF PREFERRED EMBODIMENTS

The above figures relate to a plate 10 for producing a dental implant and/or an artificial prosthesis and/or a tooth crown 14, in particular for producing a tooth crown 14 using 3D laser printing.

Figure 1:
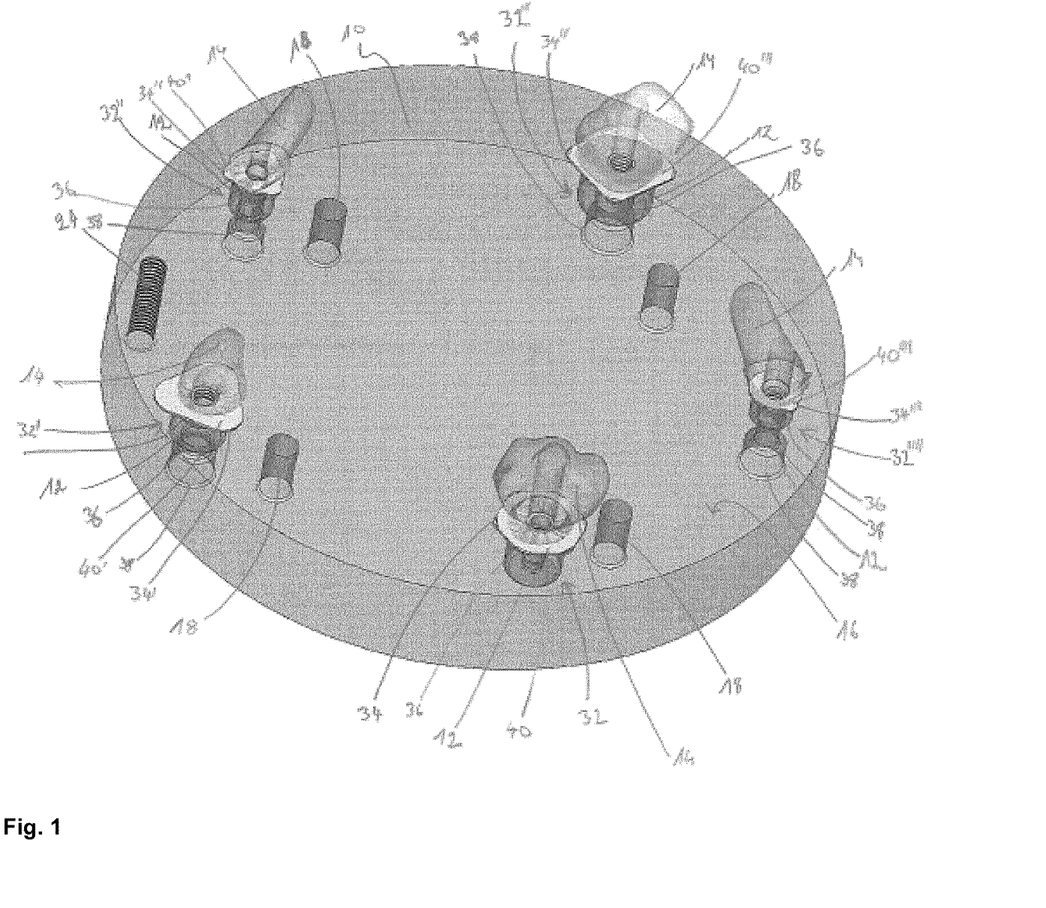
FIG. 1 is a perspective general view of the plate according to the disclosure in an assembly state of dental implant abutment and tooth crown or artificial prosthesis

FIG. 1 shows the plate 10 in a perspective view in an assembled state with dental implant abutments 12 and tooth crowns 14 or artificial prosthesis 14 (referring from now on as artificial prosthesis only) thereon. This plate 10 is used to affix/hold the dental implant abutment 12 in order to be able to produce thereon an artificial prosthesis 14 using 3D laser printing. The 3D printing, also known as additive manufacturing refers to a processes used to synthetizes a three dimensional object. 3D printing for metal mainly refers to an additive manufacturing process using sintering or melting (i.e. selective laser sintering, direct metal laser sintering and selective laser melting).

Figure 2:
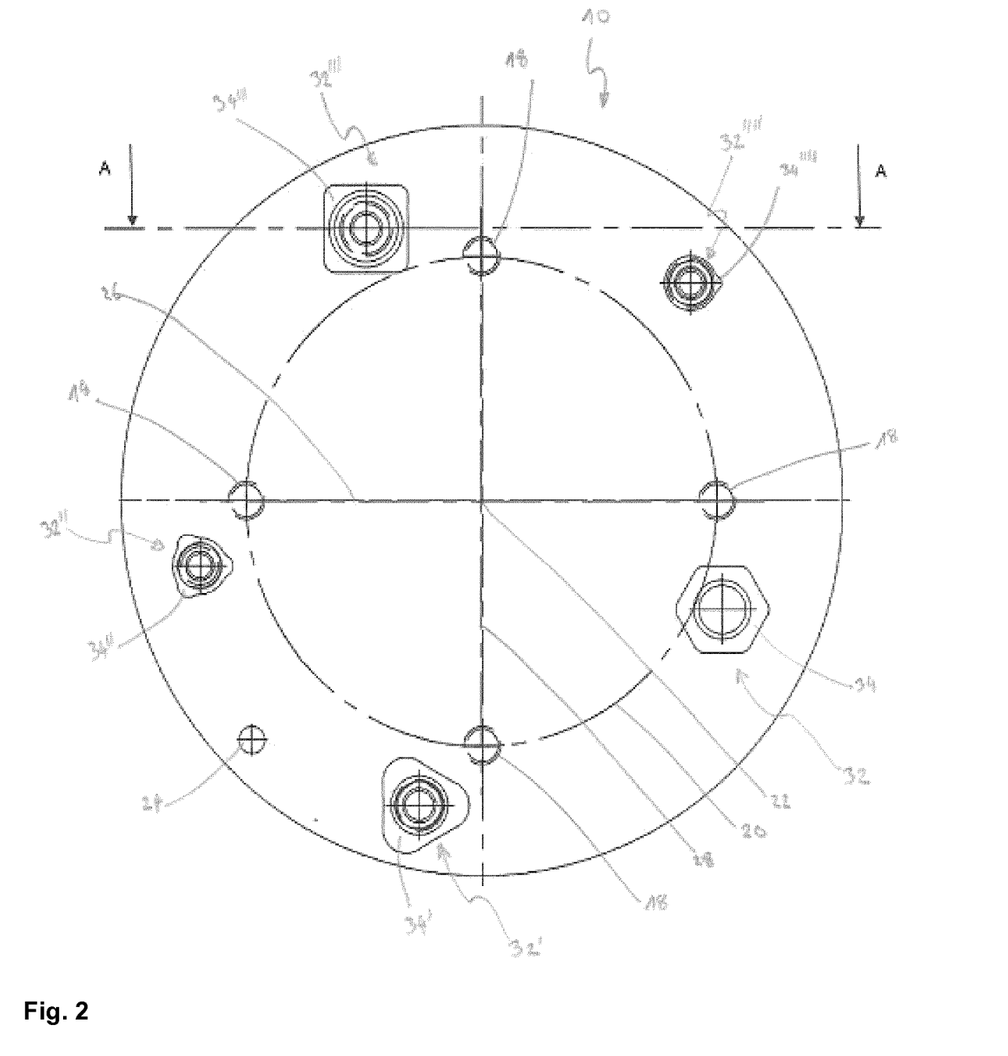
FIG. 2 is a top view of the plate according to the disclosure.

FIG. 2 shows a top view of a plate 10 for manufacturing dental implant artificial prosthesis 14 using a 3D laser printer. The plate 10 of the present disclosure as shown in FIG. 2 is of a circular form, preferably a disc shaped plate having a diameter of about 60 to 80 mm, in particular a diameter of 65 to 75 mm, more preferable of a diameter of 69 mm. The plate 10 has a thickness of 7 to 15 mm, in particular 10 mm. The plate comprises a first surface 16 and an opposite surface 30, both parallel to each other. The plate 10 is mounted to the 3D laser printer by an opposite surface 30. This opposite surface 30 is preferably a machined surface. In order to be able to precisely position the plate 10 in the 3D laser printer, in this particular case, four equally spaced fixation blind bores 18 are provided onto the opposite surface 30 of the plate 10. These 4 fixation blind bores 18 are positioned in a circle 20 with a diameter of about 45 mm coaxial to the center 22 of the plate 10. Due to the requirement of high precision, the fixation blind bores 18 have preferably a diameter of 3 mm with preferably a tolerance of H7 and a depth of about 6 mm. It is obvious that these fixation blind bores 18 could also be through bores.

The plate 10 further comprises a threaded through hole 24 with preferably a metric thread of M3. According to the embodiment shown in FIG. 1, this hole is positioned with a distance d of 22 mm away from the horizontal and vertical center line 26 and 28 respectively. This dimensions and tolerances mentioned here above may vary depending on the application and conditions.

On a first surface 16 of the plate 10, various sorts of abutment cavities 32 are provided, allowing an accommodation of a dental implant abutment. These abutment cavities 32 comprise a first cavity portion 34. In FIG. 2, the plate 10 has been presented containing abutment cavities 32 with 5 different first cavity portions 34. This has been done so for illustration purpose only. The plate 10 may contain a plurality of abutment cavities 32 with a plurality of different first cavity portions 34. The plate 10 usually contains a plurality of abutment cavities 32 comprising only one type/ the same first cavity portion 34. FIG. 2 shows a plurality of different first cavity portions 34 for illustration purposes.

A first abutment cavity 32 shown in FIG. 2 has a first cavity portion 34 of hexagonally shaped form with the corners of the hexagon being rounded. A second abutment cavity 32' has a first cavity portion 34' of a triangularly shaped form with the corners being rounded. A third abutment cavity 32" has a first cavity portion 34" which is shaped by a main circle from which three equally spaced smaller circles extending in such a way that their centers are positioned on the main circle. A fourth abutment cavity 32"' comprises a first cavity portion 34"' of rectangular shape with their corners be rounded. A fifth abutment cavity 32"" presented in FIG. 2 has a first cavity portion 34"" of circular shape from which one smaller circle extends in such a way that the center of the smaller circle lies on the edge of the main circle. This abutment cavity 32"" thus comprises a preferred first cavity portion 34"" with a non-rotational symmetry.

In these first cavity portions 34, 34', 34", 34"', 34"" rest a carrier portion 40, 40', 40", 40"', 40"" of the dental implant abutment 12. The shape of the carrier portions is such that the carrier portion fits inside the respective cavity portion. Preferably, the upper surface of the carrier portion 34 is flush with the upper surface of the plate 10.

The first cavity portions 34 of the abutment cavities 32 extent from the first surface 16 of the plate 10.

The abutment cavity 32 further comprises a second cavity portion 36. This second cavity portion 36 extends from the first cavity portion 34 of the abutment cavities 32. The first and second cavity portions are positioned coaxial to an axis 48.

Figure 3:
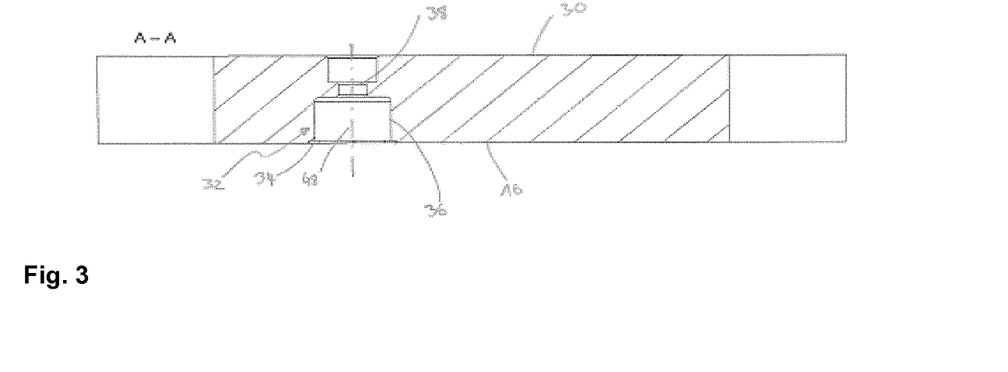
FIG. 3 is a sectional view along the line A-A from the top view of the plate in FIG. 23 is a perspective general view of the plate in an assembly state of dental implant abutment and tooth crown or artificial prosthesis.

FIG. 3 is a sectional view along the line A-A of the top view in FIG. 2 of the plate 10. From FIG. 3, the fourth abutment cavity 32 can be clearly seen in cross sectional view. This second cavity portion 36 is a substantially cylindrical blind bore and has a diameter and a depth such that the second cavity portion 36 is larger than the abutment body 46 of the dental implant abutment 12. In fact, the second cavity portion is larger than the abutment body 46 of the dental implant abutment 12.

The various types of dental implant abutment 12 available on the market differ from each other mainly by the size and the shape. The shape and the size of the dental implant abutments are adapted a.o. to the dental implant of the different manufacturers. The dental implant abutments provide slightly different properties/proportions required for the different dental implant artificial prosthesis 14. According to the embodiment shown in FIGS. 1 to 6, the second cavity portion 36 of the abutment cavities 32 are designed to be able to lodge many different types of dental implant abutment 12. The plate 10 may contain a plurality of abutment cavities 32 with the same second cavity portion 36 and the same first cavity portion 34. In fact, the second cavity portion 36 is designed and dimensioned to be able to lodge different types of dental implant abutment 12. As a result, the plate 10, according to the present disclosure, is able to be used for producing dental implant artificial prosthesis 14 on different dental implant abutment 12 of different size and shape.

So, instead of machining cavities in the plate that exactly match each type of dental implant abutment and thus have to use a multitude of plates, here it is possible to use only one plate. Indeed as the dental implant abutments need to be machined anyway, it is easy and it causes virtually no extra costs to machine a carrier plate to the dental abutment because the carrier plate is machined at the same time as the dental abutment.

On the opposite surface 30 of the plate 10, comprising the four fixation blind bores 18, the abutment cavity 32 comprises a third cavity portion being a through hole 38 coaxial to the axis 48. The through hole 38 mainly allows a fixation means 44, such as a screw, to fix the dental implant abutment 12 to the plate 10. According to the embodiment shown in FIG. 3, the through hole 38 is in the form of the counter bore through hole 38.

As it can be seen from FIG. 1, the first abutment cavity 32 with a hexagonally shaped form is not provided with a counter bore through hole 38.

According to the present embodiment, a screw can enter into the second cavity portion 36 for fixing the dental implant abutment 12 onto the plate 10. However, the first abutment cavity 32 also could be provided with counter bore through hole 38. Moreover, it is easily understood that this counter bore through hole 38 could easily be exchanged with a different type of through hole 38 allowing the dental implant abutment 12 to be fixed with a different type of fixation means 44 onto the plate 10. The through hole 38 may i.e. be a counter sunk through hole providing a self-positioning of the dental implant abutment 12 on the plate. The dental implant abutment 12 can also be fixed onto the plate 10 by any other fixation means 44, such as nuts and bolts, glue, magnet . . . .

As can be seen from FIGS. 1 and 4 to 6, the dental implant abutment comprises a carrier portion 40 and an abutment body. In fact the carrier portion extends from abutment body and is preferably shaped in the form of plate. As the second cavity portion 36 of the abutment cavity 32, allowing all sorts of abutment bodies 46 of dental implant abutment 12 to be lodged therein, is loose fit engaged with the abutment body 46, the dental implant abutment 12 is held in place by resting with its carrier portion 40 in the first cavity portion 34 of the abutment cavity 32. During the machining of the dental implant abutment 12, the carrier portion 40 is formed to have any one of the various specific shapes to engage with the first cavity portion 34 of the abutment cavity 32 in the plate 10. The engagement of the carrier portion 40 with the first cavity portion 34 is a form-fit engagement and therefore hinders any rotation of the dental implant abutment 12 relative to the abutment cavity 32 during the production of the dental implant artificial prosthesis using 3D laser printer. Once the dental implant artificial prosthesis 14 has been manufactured on the dental implant abutment 12 using the 3D laser printer, the carrier portion 40 will (at least partially) be removed by machining.

According to the embodiment shown in FIGS. 1 and 4 to 6, the form-fit engagement of the first cavity portion 40 is a full form-fit with the carrier portion 40 of the dental implant abutment. This form-fit engagement guaranties at the same time a locking against a rotation about the axis 48 as well as a self-centering onto to the plate 10.

Alternatively, a countersunk through hole (not shown), as described above, allows an adequate centering of the dental implant abutment 12 on the plate 10, such that a form fit engagement of the carrier portion 40 with only a part of the first cavity portion 34 is required to lock the dental implant abutment against rotation about the axis. In a further embodiment of the present disclosure (not shown), engages the carrier portion 40 with the first cavity portion 34 with a conical surface. As a result, the dental implant abutment 12 is self-centered onto the plate 10 and requires a form-fit engagement of the carrier portion 40 with only at least one part of the first cavity portion 34 to lock the dental implant abutment against a rotation about the axis 48.

The dental implant abutment 12 comprises an internal threaded portion to be able to engage with the screw passing through the third cavity portion 38 into the second cavity portion to be fixed onto the plate 10.

Figure 4:
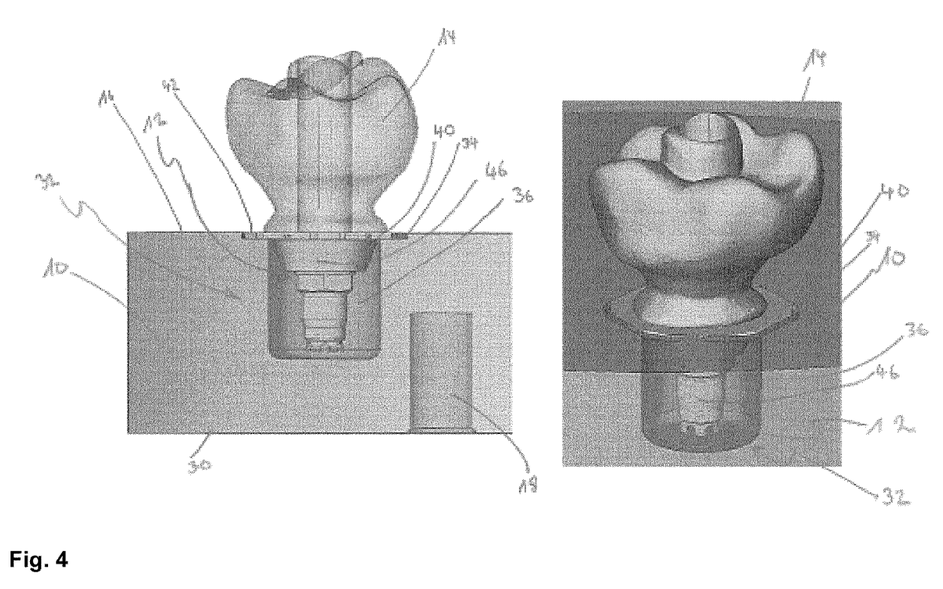
FIG. 4 is a front view and a perspective view of the plate in an assembled state with a dental implant abutment and tooth crown or artificial prosthesis.

FIG. 4 shows a focused front view of the plate 10 with the first abutment cavity 32 having a first cavity portion 34 with a hexagonal shape as well as a perspective view of the same abutment cavity 32, in both views an dental implant abutment 12 is mounted thereon comprising a more complex dental implant artificial prosthesis 14 produced thereon in a 3d laser printer.

Figure 5:
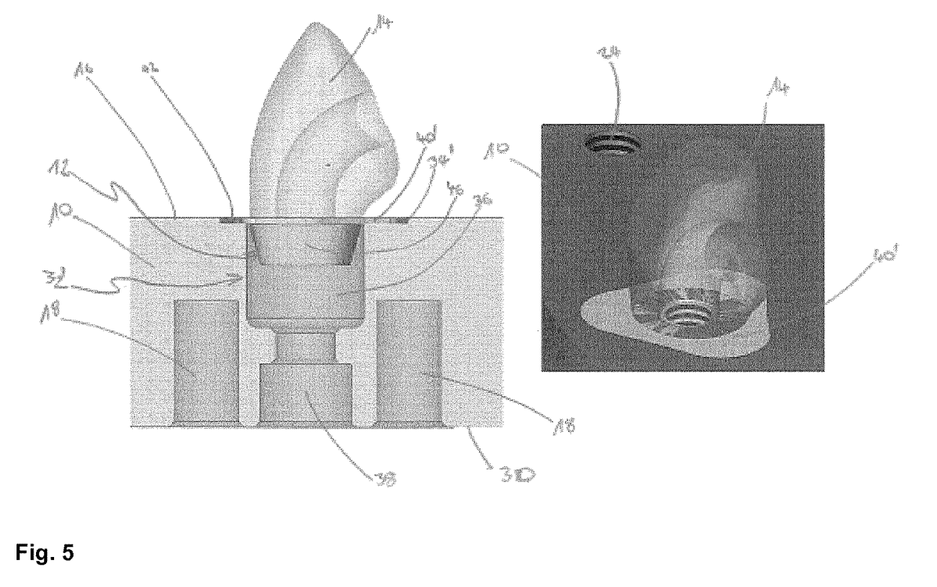
FIG. 5 is a front view and a perspective view of the plate in an assembled state with the third dental implant abutment and tooth crown or artificial prosthesis.

FIG. 5 shows a focused front view of the plate 10 with the second abutment cavity 32 having a first cavity portion 34 with a triangular form as well as a perspective view of the same abutment cavity 32, in both views a dental implant abutment 12 is mounted thereon comprising a dental implant artificial prosthesis 14 for recovering the axis produced thereon in a 3D laser printer.

From both FIGS. 4 and 5, the form-fit engagement of at least one part of the carrier portion 40 of the dental implant abutment 12 and the first cavity portion 34 of the abutment cavity 32 in the plate 10 can be clearly identified. In the embodiment of the present disclosure as shown in FIGS. 4 and 5, the depth of the first cavity portion 34 of the abutment cavity 32 is chosen to be approximately equal to the thickness of the carrier portion 40 of the dental implant abutment 12. As a result, in an assembled state, the first surface 16 of the plate 10 and the upper surface 42 of the carrier portion 40 of the dental implant abutment 12 form a flush surface to each other. This is for illustration purposes only and it can be easily understood that the upper surface 42 of the carrier portion 40 could protrude inwardly and outwardly to the first surface 16 of the plate 10.

Figure 6:
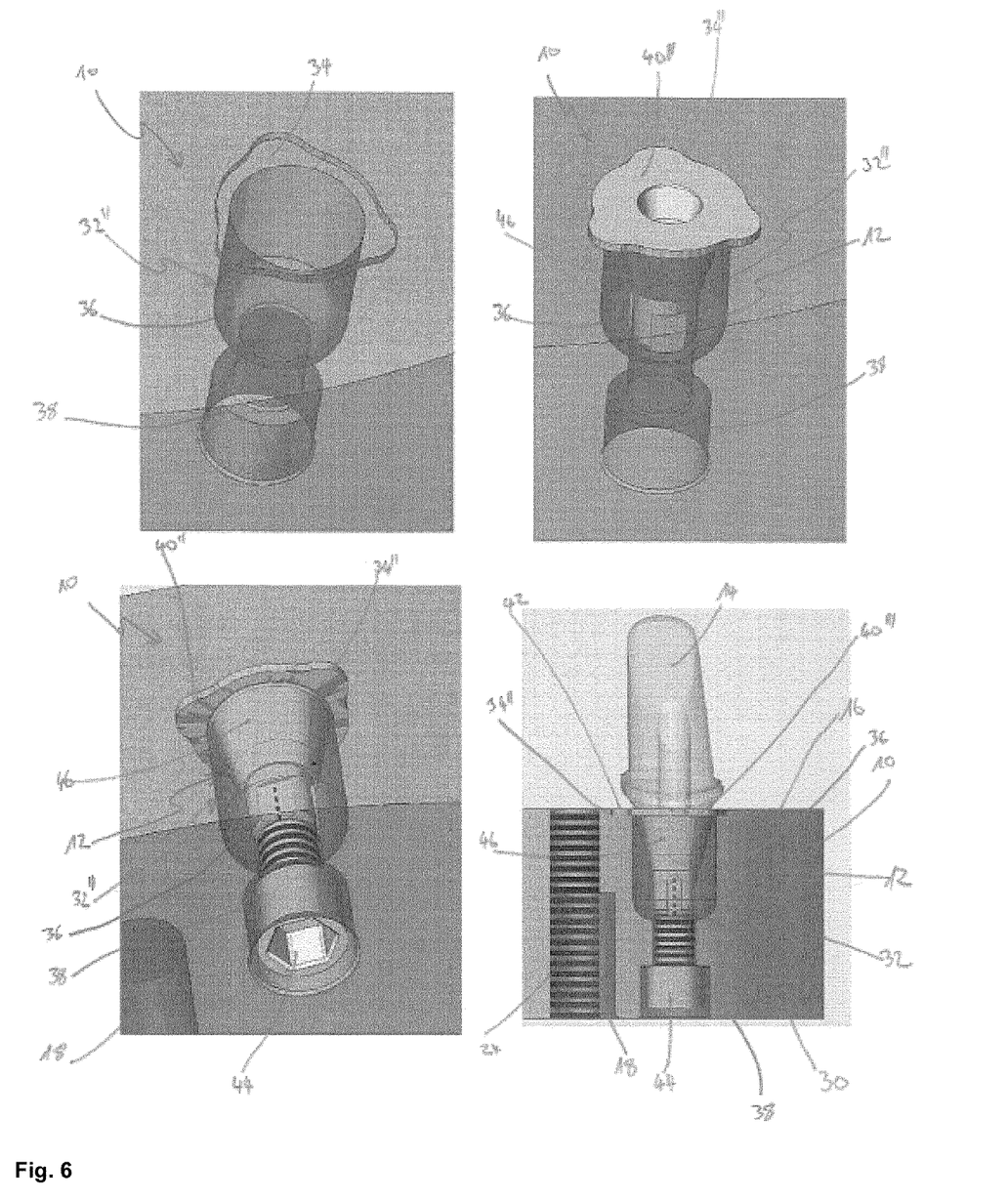
FIG. 6 is composed of three perspective views of the plate, in a assembled state with the dental implant abutment, in a fixed state of the dental Implant abutment onto the plate and of a front view of the assembled plate with the dental implant abutment, fixation means and tooth crown or artificial prosthesis.

FIG. 6 shows four different views of the third abutment cavity 32 in the plate 10 formed by the circular cavity from which three further smaller circular cavities extend such that their centers lie on the edge of the main circular cavity. The first view is a perspective view of the third abutment cavity 32 in the plate 10. The second view is a perspective view of the third abutment cavity 32 with a dental implant abutment 12 form-fit engaging with at least one part of the carrier portion 40 to the first cavity portion 34. The third view is a perspective view of the abutment cavity 32 shown from opposite surface 30 of the plate 10 comprising the four fixation blind bores 18, wherein a dental implant abutment 12 is accommodated therein and fixed with a screw 44 in the counter bore through hole 38. In this embodiment, the screw 44 has been chosen to be a socket head cap screw 44. The fourth view is a front view showing the third abutment cavity 32 in the plate 10 with the dental implant abutment 12 accommodated therein affixed with the socket head cap screw 44. The screw head is fully embedded in the counter bore through hole 38 in such a way that the head does not protrude the opposite surface 16 of the plate 10. The depth of the counter bore through hole 38 of the abutment cavity 32 is chosen so that the screw head can be fully immersed. As a result, the plate 10 is mountable to the 3D laser printer with the opposite surface 30 containing the 4 fixation blind bores.

Figure 7:
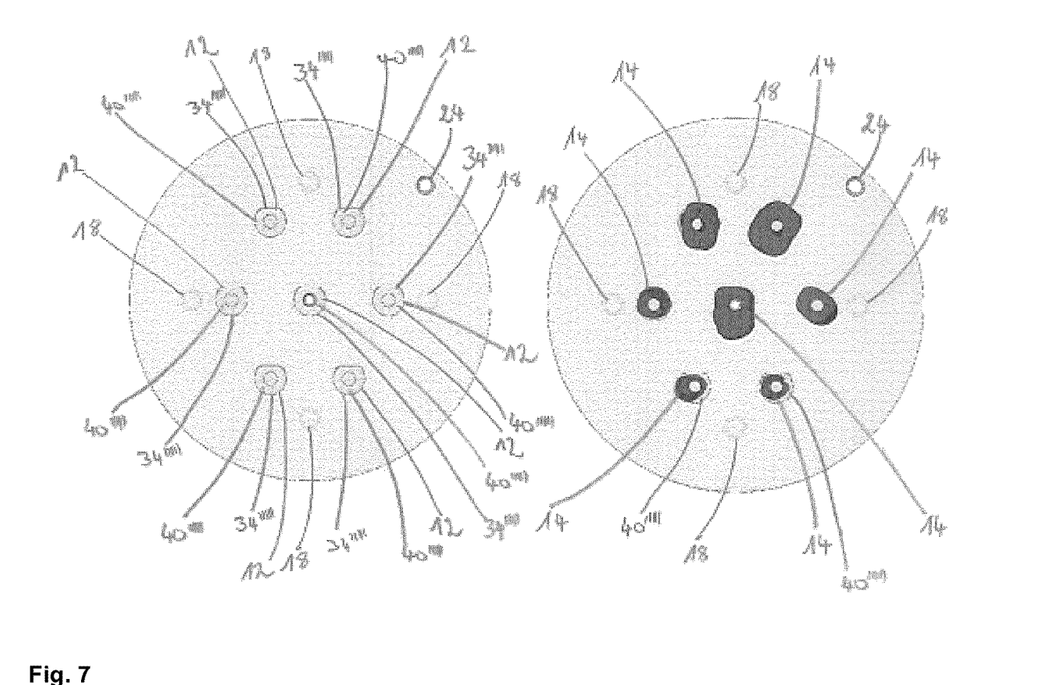
FIG. 7 is composed of two top view of a further preferred embodiment of the plate having 7 equal (identical) first cavity portion and carrier portion and tooth crown or artificial prosthesis

FIG. 7 is composed of two top view of a further preferred embodiment of a plate. The first top view shows the plate 10 according to the present disclosure comprising 7 sixth abutment cavities 32 with the same first cavity portion 34'''''. This first cavity portion 34''''' of the sixth abutment cavity 32 is of circular shape having a flatten portion and therefore has no rotational symmetry. On the plate 10 as shown in the first top view of FIG. 7 are further mounted dental implant abutments 12 comprising a carrier portion 40''''' shaped to form fit engage with the first cavity portions 34''''' of the abutment cavities 32 in the plate 10. The second top view from FIG. 7 shows an assembled plate 10 according to the present disclosure wherein different artificial prosthesis 14 have been manufactured on top of the dental implant abutment 12 using 3D laser printing.

The precise position of the plate 10 in the 3D laser printer, as well as a correct and accurate locking against rotation, centering and fixation of different dental implant abutments 12 to the plate 10 of the present disclosure allows the production of the dental implant artificial prosthesis 14 without the necessity of manufacturing and machining a new and suitable physical master model.

The invention claimed is:

1. A set for the production by 3D printing of implant abutments for dental implants, the set comprising,
   at least one abutment comprising an elongated base member with an axis, and at least one positioning element fixed to the base member;
   a plate with at least one recess and a locking portion;
   wherein the recess is larger than the elongated base member, wherein the locking portion is configured to be in a form fit connection with the positioning element in order to vertically position the abutment, and lock the abutment in rotation around its axis and self-center the abutment onto the plate, and
   wherein the positioning element of the abutment is made in the form of a plate extending from the base member, such that both the positioning element and the locking portion are disposed at a surface region of the plate.

2. The set according to claim 1, wherein the plate comprises a plurality of recesses.

3. The set according to claim 2, wherein all the recesses have the same dimensions.

4. The set according to claim 1, wherein the locking portion of the recess is a cylinder centered on an axis of the recess with a base that extends from the cylinder.

5. The set according to claim 1, wherein the locking portion of the recess is a cylinder with a base that has a non-rotational symmetry.

6. The set according to claim 1, wherein the recess of the plate comprises a fixation portion comprising a through hole.

7. The set according to claim 6, wherein said through hole is a counter bore through hole or countersunk through hole for accommodating a fixation means, to fix the abutment to the plate.

8. The set according to claim 1, wherein the positioning element and the base member of the abutment are made out of one piece.

* * * * *